J. S. HILDEBRAND.
CANNING APPARATUS.
APPLICATION FILED SEPT. 29, 1909.
959,861.
Patented May 31, 1910.
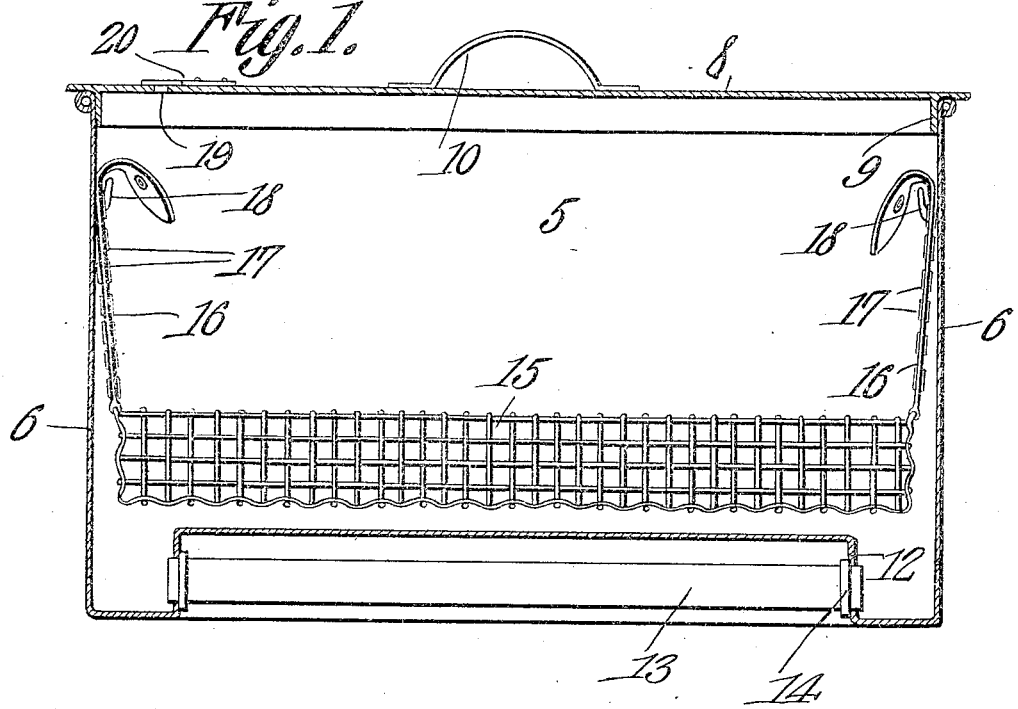
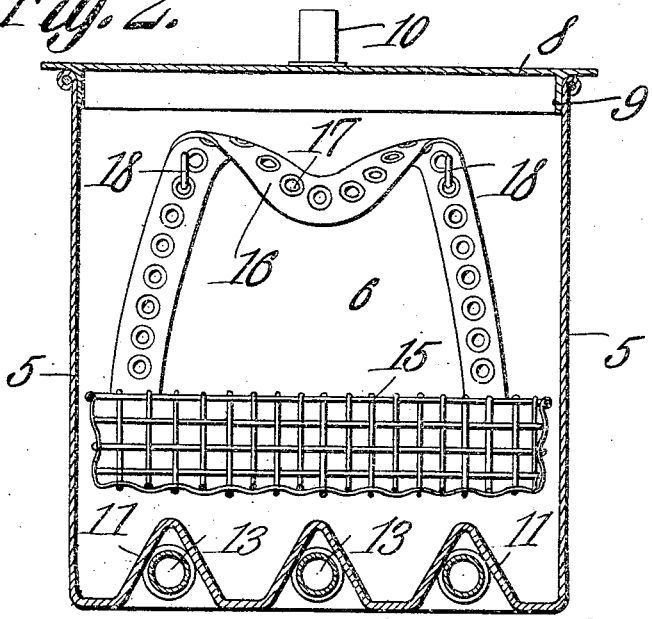
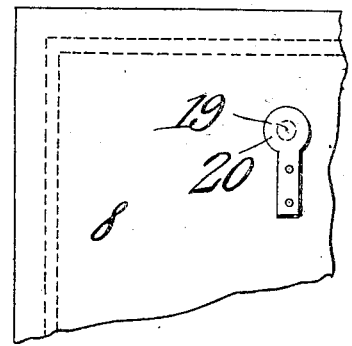
INVENTOR,
John S. Hildebrand.

UNITED STATES PATENT OFFICE.

JOHN SOLOMON HILDEBRAND, OF NEAR HILDEBRAN, NORTH CAROLINA.

CANNING APPARATUS.

959,861.  Specification of Letters Patent.  Patented May 31, 1910.

Application filed September 29, 1909. Serial No. 520,153.

*To all whom it may concern:*

Be it known that I, JOHN SOLOMON HILDEBRAND, a citizen of the United States, residing near Hildebran, in the county of Catawba and State of North Carolina, have invented a new and useful Canning Apparatus, of which the following is a specification.

It is the object of the present invention to provide an improved canning apparatus and the invention relates more specifically to that class of such apparatus in which the food stuff to be canned is subjected to the action of steam.

It is one aim of the invention to provide for a quick, constant, voluminous generation of steam without the necessity of subjecting the apparatus to a considerable flame area. The apparatus embodying the present invention is, broadly speaking, a container in which is supported a receptacle into which the food stuff to be canned is placed, steam being generated in the container and acting upon the food stuff in the receptacle and whereas heretofore devices of this general class have been constructed to be partly filled with water and to be disposed above a flame heating the under side of the container whereby the steam will be generated the present invention contemplates subjecting, to the heating action of the flame, one or more water tubes which are supported beneath the container and open at their ends into the bottom thereof.

The invention further contemplates arranging the water tubes in channels or recesses in the bottom of the container, the walls of the channels serving to present additional heating surface to the flame area.

It is the aim of the invention, further, to provide for supporting the receptacle for the cans of food stuffs to be subjected to the action of the steam, at various elevations within the container whereby to adapt the apparatus for use in canning food stuffs of various kinds and the invention aims, in this connection, to so construct the suspending means for the receptacle that it may be readily grasped for the purpose of carrying the receptacle from place to place and lowering the same into the container, the suspension means being of some flexible material such as cloth which is by no means as good a conductor of heat as metal.

In the accompanying drawings, Figure 1 is a vertical longitudinal sectional view through the apparatus embodied in the present invention. Fig. 2 is a vertical transverse sectional view therethough, and Fig. 3 is a top plan view of one corner of the apparatus.

In the drawings, the apparatus is illustrated as embodied in part in a container which is preferably rectangular and has side walls 5, end walls 6, and a bottom, the container being open at its top but provided with a cover which is indicated by the numeral 8 and is formed with a depending continuous flange 9 which fits within the open upper end of the container. The cover 8 is provided with a handle 10 which may be grasped for the purpose of removing it from the container.

As heretofore stated, there is provided, beneath the container, a steam generator and this portion of the apparatus is embodied in water tubes which are positioned in channels in the bottom wall of the container. The channels mentioned are indicated by the numeral 11, they being substantially of inverted V form in cross section. Each channel 11 extends lengthwise of the container and has end walls 12 which are spaced from the end walls of the container as clearly shown in Fig. 1 of the drawings. The water tubes above mentioned are indicated by the numeral 13 and each tube is arranged in one of the channels mentioned, preferably lying wholly within the same, and opening at its ends through the end walls 12 of the respective channel, there being a collar 14 secured upon the tube adjacent each end thereof and abutting against the adjacent end wall of the channel whereby to hold the flue against longitudinal displacement.

It will be readily understood from the foregoing that not only is a greater heat area afforded by providing the channel 11 in the bottom wall of the container but by arranging the water tubes one in each of the said channels, the flames of the stove or the heat currents are directed around the water tubes whereby to more thoroughly heat them, the result being that water in container will be more rapidly heated than is the case when the ordinary form of container is employed.

The receptacle supported within the container is one into which are introduced the cans of food stuffs to be subjected to the action of the steam generated within the container and this receptacle is indicated by the numeral 15 and is preferably of wire mesh material it being in the form of a basket which is rectangular and of nearly the same dimensions as the said container. The means provided for suspending this receptacle within the container is embodied in yokelike straps 16 which are of some flexible material, preferably heavy canvas or other heavy cloth and these strips are secured at their extremities each to one end of the receptacle or basket 15. Each of the strips 16 has riveted therethrough at a plurality of points in its length, eyelets 17, and formed or secured upon the end walls 6 of the receptacle and projecting inwardly and upwardly from the inner surfaces thereof, are suspension hooks 18, there being two such hooks upon each end wall of the container. In disposing the receptacle within the container, the suspending straps have corresponding eyelets engaged with the hooks upon the adjacent end walls of the container and inasmuch as such engagement of the eyelets with the hooks is interchangeable, it will be readily understood that the receptacle may be supported at various elevations within the container. It will further be understood that inasmuch as the suspending straps are of cloth, they will not become heated to such high degree as would metallic straps or similar suspending devices; hence the suspending straps may be grasped without danger of burning the operator's hand.

As illustrated in Figs. 1 and 2 of the drawings, the cover 8 is formed with an opening 19 which is normally closed by a resilient flap valve 20 secured upon the upper surface of the cover and having a free end portion projecting over the said opening.

In using the apparatus, the receptacle 15 is filled or partly filled with cans of food stuff to be subjected to the action of steam generated within the container and the said receptacle is then suspended at the proper elevation in the container by engaging the eyelets of the suspending straps with the hooks from the end walls of the container. Before arranging the receptacle within the container, water is poured into the container until it has reached a level immediately above the upper sides or ridges of the channels. The cover 8 is then placed upon the container and the container is disposed upon a stove or similar heating apparatus. The valve 20 permits of the escape of steam from the container when the pressure therein has reached a predetermined limit.

It will be understood that any suitable form of handle may be employed in connection with the suspending straps 16 but inasmuch as such a handle forms no part of the present invention, the same has not been illustrated.

What is claimed is:

1. In a device of the class described, a container, this container being provided in its bottom wall with a plurality of channels having end walls, and water tubes arranged one within each of the channels and opening at its ends through the said end walls thereof.

2. In a device of the class described, a container, this container being provided in its bottom wall with a plurality of channels having end walls, and water tubes arranged one within each of the channels and opening at its ends through the said end walls thereof, said water tubes being completely housed in said channels.

In testimony that I claim the foregoing as my own, I have hereto affixed my signature in the presence of two witnesses.

JOHN SOLOMON HILDEBRAND.

Witnesses:
JAMES C. SHUFORD,
A. L. SHUFORD.